United States Patent
Fan et al.

(10) Patent No.: US 9,882,808 B2
(45) Date of Patent: Jan. 30, 2018

(54) PACKET PROCESSING METHOD AND APPARATUS

(71) Applicant: Huawei Technologies Co., Ltd., Shenzhen, Guangdong (CN)

(72) Inventors: Duoliang Fan, Nanjing (CN); Yang Wang, Nanjing (CN); Bo Zhang, Nanjing (CN); Qin Wu, Nanjing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 235 days.

(21) Appl. No.: 14/934,943

(22) Filed: Nov. 6, 2015

(65) Prior Publication Data

US 2016/0065460 A1   Mar. 3, 2016

Related U.S. Application Data

(63) Continuation of application No. PCT/CN2014/076824, filed on May 6, 2014.

(30) Foreign Application Priority Data

May 10, 2013 (CN) .......................... 2013 1 0173260

(51) Int. Cl.
  *H04J 3/16* (2006.01)
  *H04L 12/781* (2013.01)
  *H04L 29/06* (2006.01)
  *H04L 12/58* (2006.01)

(52) U.S. Cl.
  CPC .............. *H04L 45/52* (2013.01); *H04L 51/18* (2013.01); *H04L 69/18* (2013.01)

(58) Field of Classification Search
  CPC ...................................................... H04L 45/52
  USPC ............................................................. 370/465
  See application file for complete search history.

(56) References Cited

U.S. PATENT DOCUMENTS

| | | |
|---|---|---|
| 2006/0083367 A1 | 4/2006 | Schepers |
| 2008/0228932 A1 | 9/2008 | Monette et al. |
| 2009/0111509 A1 | 4/2009 | Mednieks et al. |
| 2009/0138471 A1 | 5/2009 | Zhang et al. |
| 2010/0005143 A1 | 1/2010 | Weens et al. |
| 2010/0008271 A1 | 1/2010 | Duan |
| 2012/0093158 A1 | 4/2012 | Chiba |

FOREIGN PATENT DOCUMENTS

| | | |
|---|---|---|
| CN | 1758625 A | 4/2006 |
| CN | 101022350 A | 8/2007 |
| CN | 101035111 A | 9/2007 |
| CN | 101523868 A | 9/2009 |

(Continued)

*Primary Examiner* — Shripal Khajuria (57) ABSTRACT

Embodiments of the present disclosure provide a packet processing method and apparatus. A first protocol identifier of a first to-be-processed packet is acquired; and first protocol rule profile information that corresponds to the first protocol identifier is acquired from a rule profile repository, where the rule profile repository stores protocol rule profile information of at least one protocol, protocol rule profile information of each protocol in the at least one protocol is associated with a protocol identifier of the protocol, the protocol rule profile information of the protocol is used to describe a method and a parameter for processing a packet, and the packet meets a standard stipulated by the protocol; and the first to-be-processed packet is processed according to the acquired first protocol rule profile information.

12 Claims, 4 Drawing Sheets

(56) References Cited

FOREIGN PATENT DOCUMENTS

| | | |
|---|---|---|
| CN | 101641912 A | 2/2010 |
| CN | 102884769 A | 1/2013 |
| JP | 2005-064803 A | 3/2005 |
| JP | 2010-041553 A | 2/2010 |
| JP | 2010-521857 A | 6/2010 |
| JP | 2011-199622 A | 10/2011 |
| WO | WO 2008/110955 A2 | 9/2008 |

PACKET PROCESSING METHOD AND APPARATUS

CROSS-REFERENCE TO RELATED APPLICATIONS

This application is a continuation of International Application No. PCT/CN2014/076824, filed on May 6, 2014, which claims priority to Chinese Patent Application No. 201310173260.4, filed on May 10, 2013, both of which are hereby incorporated by reference in their entireties.

TECHNICAL FIELD

Embodiments of the present disclosure relate to the field of information technologies, and in particular, to a packet processing method and apparatus.

BACKGROUND

To meet increasing network service demands of users, various new network technologies, for example, layer-2 network technologies such as an NVGRE (Network Virtualization using Generic Routing Encapsulation) technology and a VXLAN (virtual extensible local area network) technology, are generated. As new network technologies emerge, it is inevitable that new network protocols constantly emerge to cooperate with network services, but new network protocols introduce a new problem to existing network services, that is, existing network service methods are inapplicable to networks using new network protocols, for example, an existing communication method cannot be used for communication between a layer-2 network and a traditional network.

To solve the foregoing problem, program developers develop, according to new network protocols, complete programs for implementing network services, where the programs further need to be compatible with networks that use traditional network protocols, and the networks that use new network protocols and the networks that use traditional network protocols can compatibly provide network services in coordination. In other words, program developers need to develop a set of complete programs for each network protocol used by a network, but many development resources need to be invested to develop programs that support a network protocol, and a development cycle is long, which affects network service performance.

SUMMARY

Embodiments of the present disclosure provide a packet processing method, which helps solve a problem in the prior art that development of programs that support a new network protocol affects network service performance.

According to a first aspect, an embodiment of the present disclosure provides a packet processing method, including:

acquiring a first protocol identifier of a first to-be-processed packet;

acquiring, from a rule profile repository, first protocol rule profile information that corresponds to the first protocol identifier, where the rule profile repository stores protocol rule profile information of at least one protocol, protocol rule profile information of each protocol in the at least one protocol is associated with a protocol identifier of the protocol, the protocol rule profile information of the protocol is used to describe a method and a parameter for processing a packet, and the packet meets a standard stipulated by the protocol; and processing the first to-be-processed packet according to the first protocol rule profile information.

According to a second aspect, an embodiment of the present disclosure provides a packet processing apparatus, including:

a protocol identifier acquiring module, configured to acquire a first protocol identifier of a first to-be-processed packet;

a rule profile acquiring module, configured to acquire, from a rule profile repository, first protocol rule profile information that corresponds to the first protocol identifier, where the rule profile repository stores protocol rule profile information of at least one protocol, protocol rule profile information of each protocol in the at least one protocol is associated with a protocol identifier of the protocol, the protocol rule profile information of the protocol is used to describe a method and a parameter for processing a packet, and the packet meets a standard stipulated by the protocol; and a processing module, configured to process the first to-be-processed packet according to the first protocol rule profile information.

In the packet processing method and apparatus provided in the embodiments of the present disclosure, during processing on a to-be-processed packet, the packet may be processed according to protocol rule profile information in a rule profile repository. That is, the processing on the packet may not be limited by a protocol, a process of processing the packet is simplified, and processing programs do not need to be developed according to a protocol, thereby saving development resources, and helping improve network service performance.

BRIEF DESCRIPTION OF THE DRAWINGS

To describe the technical solutions in the embodiments of the present disclosure more clearly, the following briefly introduces the accompanying drawings required for describing the embodiments. Apparently, the accompanying drawings in the following description show some embodiments of the present disclosure, and persons of ordinary skill in the art may still derive other drawings from these accompanying drawings without creative efforts.

DETAILED DESCRIPTION

To make the objectives, technical solutions, and advantages of the embodiments of the present disclosure clearer, the following clearly describes the technical solutions in the embodiments of the present disclosure with reference to the accompanying drawings in the embodiments of the present disclosure. Apparently, the described embodiments are some but not all of the embodiments of the present disclosure. All other embodiments obtained by persons of ordinary skill in the art based on the embodiments of the present disclosure without creative efforts shall fall within the protection scope of the present disclosure.

Figure 1:
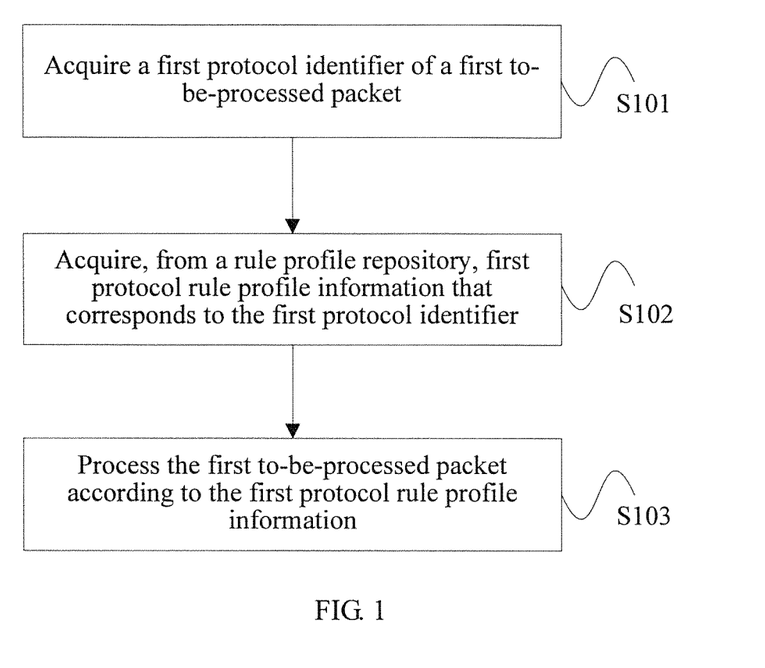
FIG. 1 is a flowchart of Embodiment 1 of a packet processing method according to the present disclosure.

FIG. 1 is a flowchart of Embodiment 1 of a packet processing method according to the present disclosure. As shown in FIG. 1, the method in this embodiment may be implemented by a packet processing apparatus, and the processing apparatus may be implemented by means of hardware and/or software, and is preferably disposed in a device that has functions of receiving, sending, and processing data, to complete packet processing. The method includes:

S101: Acquire a first protocol identifier of a first to-be-processed packet.

According to different protocols, encapsulation methods, formats, and parameters that correspond to the protocols and are used for a to-be-processed packet that may be processed by the packet processing apparatus are different; therefore, methods used by the packet processing apparatus to acquire a protocol identifier are also different (for example, in the prior art, different protocol identification programs are developed for different protocols). In this embodiment, a method universally applicable to at least one of the foregoing protocols may be used to acquire a protocol identifier. For example, in a method, the first to-be-processed packet may be read according to a read location that is of a protocol identifier and that is described in protocol rule profile information, which is in a rule profile repository, of at least one protocol; and when a read result matches a parameter that is described in the protocol rule profile information and corresponds to the read location, the first protocol identifier of the first to-be-processed packet is determined, where the rule profile repository is located in the packet processing apparatus, and is used to store the protocol rule profile information of the at least one protocol. For example, the rule profile repository stores protocol rule profile information obtained by parsing two types of protocols, where a read location that is of a protocol identifier and that is described in a first type of protocol rule profile information is the tenth byte after an Ethernet header field, and a value of the protocol identifier is 0x11; and a read location that is of a protocol identifier and that is described in a second type of protocol rule profile information is the fourteenth byte after the Ethernet header field, and a value of the protocol identifier is 0x1F. The tenth byte and the fourteenth byte after the Ethernet header field of the to-be-processed packet are separately read according to the two types of protocol rule profile information. A result obtained by reading the tenth byte after the Ethernet header field is 0x13, which fails in matching a first protocol; however, a result obtained by reading the fourteenth byte after the Ethernet header field is 0x1F, which succeeds in matching a second protocol; and therefore, the protocol identifier of the to-be-processed packet is a second protocol identifier 02.

In another method, the first protocol identifier of the first to-be-processed packet is read from a preset location of the first to-be-processed packet. That is, a preset location is reserved for each packet with different encapsulation methods according to a uniform standard, and is used to place a protocol identifier of the packet. For example, the uniform standard stipulates that a preset location is the first bit of a packet; and the packet processing apparatus reads the first bit of the first to-be-processed packet when receiving the first to-be-processed packet, and determines the first protocol identifier of the first to-be-processed packet when a read result matches a parameter that is described in protocol rule profile information and corresponds to the preset location. For example, a result obtained by the packet processing apparatus by reading the first bit of the first to-be-processed packet is 0x1F, which matches a parameter that is described in protocol rule profile information, which is stored in the rule profile repository in the apparatus, of each protocol in at least one protocol and corresponds to the first bit, and the first protocol identifier of the first to-be-processed packet is determined. It may also be understood that when the packet processing apparatus currently supports only one protocol, the packet processing apparatus matches the read result with a known parameter of the packet processing apparatus, and determines the protocol identifier of the to-be-processed packet.

Flexibly, when the protocol rule profile information of each protocol in the at least one protocol is associated with the parameter that is described in the protocol rule profile information of the protocol and used for acquiring the protocol identifier, during determining of the first protocol identifier of the first to-be-processed packet, the read result may be used as the protocol identifier. For example, the protocol rule profile information of the second protocol is stored in the rule profile repository in association with the parameter 0x1F described in the protocol rule profile information of the second protocol, and when the result obtained by reading the fourteenth byte after the Ethernet header field of the first to-be-processed packet is consistent with 0x1F, it is determined that the first protocol identifier of the first to-be-processed packet is 0x1F.

S102: Acquire, from a rule profile repository, first protocol rule profile information that corresponds to the first protocol identifier.

The rule profile repository stores protocol rule profile information of at least one protocol, the protocol rule profile information of the at least one protocol is associated with a protocol identifier of the at least one protocol, the protocol rule profile information of the at least one protocol is used to describe a method and a parameter for processing a packet, and the packet meets a standard stipulated by the at least one protocol, where protocol rule profile information of each protocol in the at least one protocol is written in a uniform language that can be read by the packet processing apparatus. That is, the rule profile repository stores the protocol rule profile information of the at least one protocol, and when processing the first to-be-processed packet, the packet processing apparatus processes the first to-be-processed packet by using only first protocol rule profile information that corresponds to the first protocol identifier acquired in S101.

S103: Process the first to-be-processed packet according to the first protocol rule profile information.

For example, processing performed by the packet processing apparatus on the first to-be-processed packet is network communication, and specific operations include learning a packet address, searching for a forwarding table, re-encapsulating a packet, and sending the packet. The multiple operations are already built in the packet processing apparatus, and the first to-be-processed packet is processed in the multiple operations according to the first protocol rule profile information. The multiple operations may be understood as built-in operations irrelevant to a protocol, that is, during processing on a packet under each protocol, the packet is processed in each operation according to protocol rule profile information that is acquired according to a protocol identifier. A packet is processed according to each of the foregoing operations in network communication under each protocol; therefore, during specific processing on a packet under a protocol, the packet is processed in the built-in operations according to a method and a parameter that are described in protocol rule profile information, which is in the rule profile repository, of the protocol.

Therefore, it may be understood that the built-in operations are built in the packet processing apparatus; when needing to cope with a new protocol, the packet processing apparatus parses content of the new protocol to obtain protocol rule profile information when processing a packet under the new protocol, and stores the protocol rule profile information in the rule profile repository in the packet processing apparatus; and during processing on the packet under the new protocol, the packet may be processed in the built-in operations according to the protocol rule profile information, which is in the rule profile repository, of the new protocol.

In this embodiment, each protocol is parsed to obtain protocol rule profile information, and the protocol rule profile information is stored in a rule profile repository; and during processing on a packet, the packet may be processed in built-in operations according to the protocol rule profile information. That is, the processing on the packet may not be limited by each protocol, a process of processing the packet is simplified, and processing programs do not need to be developed according to a protocol, thereby saving development resources, and helping improve network service performance.

Figure 2:
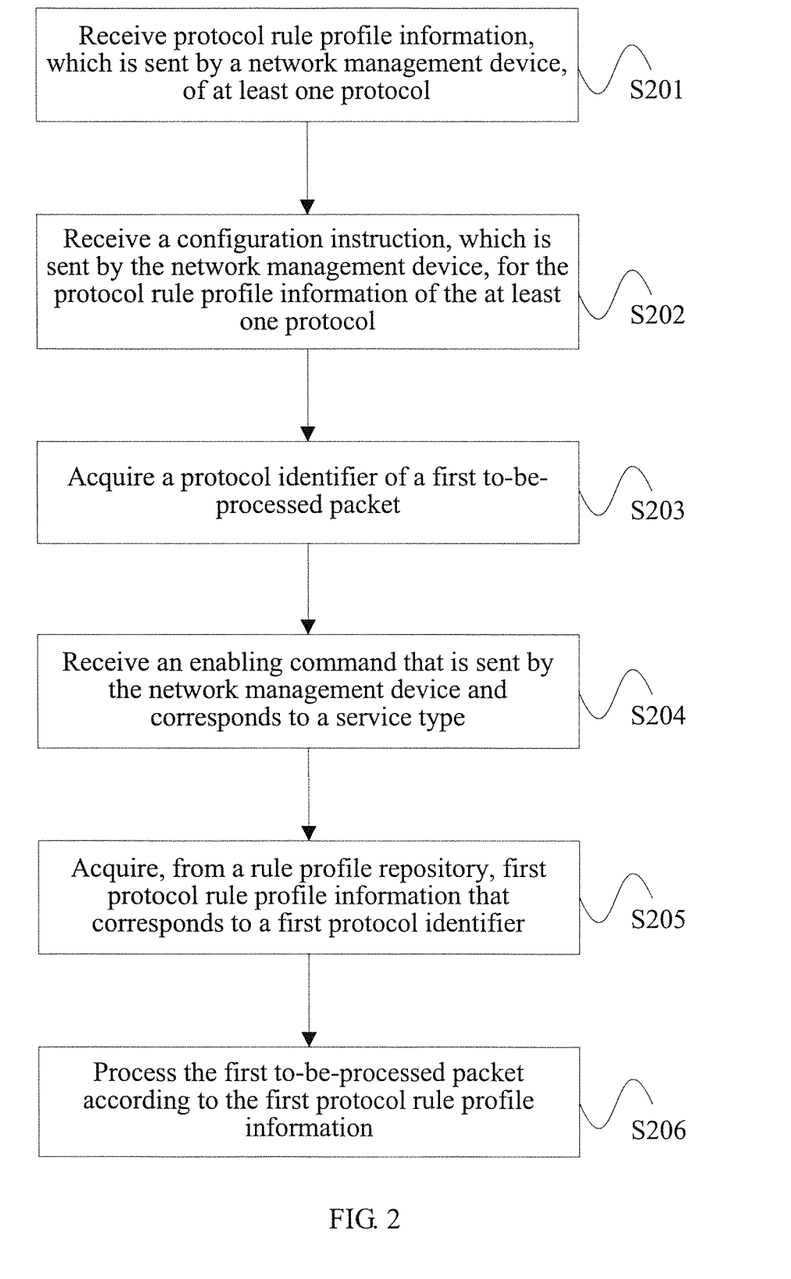
FIG. 2 is a flowchart of Embodiment 2 of a packet processing method according to the present disclosure.

FIG. 2 is a flowchart of Embodiment 2 of a packet processing method according to the present disclosure. As shown in FIG. 2, the method includes:

S201: Receive protocol rule profile information, which is sent by a network management device, of at least one protocol.

For example, when a packet processing apparatus is used for the first time, the network management device sends corresponding protocol rule profile information according to at least one protocol that needs to be supported by the packet processing apparatus. For example, a packet processing apparatus is to be used in a network environment in which two protocols are used, and the network management device parses the two protocols to obtain protocol rule profile information described in a uniform language that can be read by the packet processing apparatus, and sends the protocol rule profile information of the two protocols to the packet processing apparatus. For another example, as new technologies develop, a network that uses a third protocol emerges, but a current packet processing apparatus is only applicable to two protocols that emerge before the third protocol. To enable the packet processing apparatus to be applicable to the network that uses the third protocol, the network management device parses the third protocol to obtain protocol rule profile information of the third protocol, and sends the protocol rule profile information of the third protocol to the packet processing apparatus, where the protocol rule profile information of the third protocol is written in a language that is uniform with that of the protocol rule profile information of the two protocols and can be read by the packet processing apparatus. When receiving the protocol rule profile information, which is sent by the network management device, of the at least one protocol, the packet processing apparatus associates the protocol rule profile information of the at least one protocol with a protocol identifier of the at least one protocol, and stores the protocol rule profile information of the at least one protocol in a rule profile repository, which may also be understood as configuring, in the packet processing apparatus, a method and a parameter that are needed for processing a packet.

The protocol rule profile information that corresponds to the at least one protocol is obtained by the network management device by parsing content of the at least one protocol, and a method and a parameter for processing a packet that meets a standard stipulated by each protocol of the at least one protocol are stipulated in content of the protocol. For example, a protocol stipulates a format and content of a packet, and a method and a parameter that should be used for processing a packet for which the protocol is used are obtained by parsing the protocol, that is, protocol rule profile information of the protocol is obtained.

S202: Receive a configuration instruction, which is sent by the network management device, for the protocol rule profile information of the at least one protocol.

The configuration instruction is a configuration command for the protocol rule profile information of the at least one protocol, for example, to enable or disable a piece of protocol rule profile information, or set interworking between rule profile information under two protocols.

It should be noted that S201 and S202 are optional steps, that is, when the packet processing apparatus is used for the first time and not configured with protocol rule profile information, or protocols that need to be supported by the packet processing apparatus change, S201 and S202 are performed, that is, content of a related protocol is parsed to obtain rule profile information of the protocol, and the rule profile information is configured in the packet processing apparatus. For a packet processing apparatus that is already configured with protocol rule profile information and can process a packet, during processing on the foregoing first to-be-processed packet, S201 and S202 do not need to be performed, and S203 may be directly performed.

S203: Acquire a protocol identifier of a first to-be-processed packet.

Specific content is described in S101 in Embodiment 1, and is not described in detail herein again.

S204: Receive an enabling command that is sent by the network management device and corresponds to a service type.

As network services become diversified, a same packet processing apparatus may perform multiple types of services such as a network communications service and a subscription information acquiring service, and for different services, the packet processing apparatus processes packets in different procedures. For example, for the network communications service, a processing procedure thereof is sequentially learning a packet address, searching for a forwarding table, and re-encapsulating a packet, but a processing procedure of the subscription information acquiring service is sequentially identifying a subscription item symbol, searching for subscription information, subscription information matching, and the like. The foregoing operations are configured in the packet processing apparatus as different built-in operations according to different service types; therefore, before processing the first to-be-processed packet, the packet processing apparatus needs to receive the enabling command that is sent by the network management device and corresponds to a service type, that is, the packet processing apparatus enables, according to the enabling command, a service type for which the packet processing apparatus is currently responsible. For example, two sets of built-in operations that correspond to two service types are built in the packet processing apparatus, where one set of built-in operations is responsible for the network interworking service, and the other set of built-in operations is responsible for the subscription information acquiring service; in a current working environment, the packet processing apparatus is responsible only for the network interworking service; and according to the received enabling command that corresponds to a service type (for performing network interworking), the network interworking service is selected to be enabled (that is, the corresponding built-in operations are enabled), and the subscription information acquiring service is disabled (that is, the corresponding built-in operations are disabled). However, it should be noted that when it is preset during initialization that the packet processing apparatus is responsible only for one service type (correspondingly, rule profile information corresponds only to this service type), or after the packet processing apparatus already enables, according to the enabling command sent by the network management device, a service type for which the packet processing apparatus is responsible, in a subsequent packet processing process, S204 may not be performed, and S205 may be directly performed. In this embodiment, as an example, the packet processing apparatus is responsible for processing multiple types of services, and does not enable a service type for which the packet processing apparatus is responsible, that is, S204 is performed. S204 may be performed before S203, or may be performed after S203.

S205: Acquire, from a rule profile repository, first protocol rule profile information that corresponds to a first protocol identifier.

Protocol rule profile information of each protocol in the protocol rule profile information, which is stored in the rule profile repository, of the at least one protocol is classified, according to at least one service type, into at least one piece of protocol rule profile sub-information, and the protocol rule profile sub-information is associated with the service type, where the protocol rule profile sub-information is used to describe a method and a parameter for processing, based on the service type, the packet; therefore, when the packet processing apparatus is responsible only for one service type, the protocol rule profile sub-information may be equivalent to the protocol rule profile information. In this embodiment, first protocol rule profile sub-information, which corresponds to the service type, of the first protocol rule profile information that corresponds to the first protocol identifier is acquired from the rule profile repository according to the first protocol identifier acquired in S203 and the enabling command, which is received in S204, for enabling a service type.

S206: Process the first to-be-processed packet according to the first protocol rule profile information.

For example, the first protocol rule profile information includes a method for processing and a parameter that are used when a packet is processed according to the network communications service, and the method for processing includes at least one of the following methods:

identifying a protocol, learning an address, re-encapsulating, acquiring a flow identifier, and determining a sending interface; and optionally, the parameter includes at least one of the following parameters:

a protocol identifier, a packet format, a source Internet Protocol (IP) address, a destination IP address, a destination Media Access Control (MAC) address, a source MAC address, a network identifier, and a computing value for determining the sending interface.

Processing on the packet is completed according to the method for processing and the parameter that are described in the protocol rule profile information, which is described in S103, and is not described in detail herein again.

In this embodiment, each protocol is parsed to obtain protocol rule profile information, and the protocol rule profile information is stored in a rule profile repository; and during processing on a packet, the packet is processed according to the protocol rule profile information. That is, the processing on the packet may not be limited by a protocol, a process of processing the packet is simplified, and processing programs do not need to be developed according to a protocol, thereby saving development resources, and helping improve network service performance.

Figure 3:
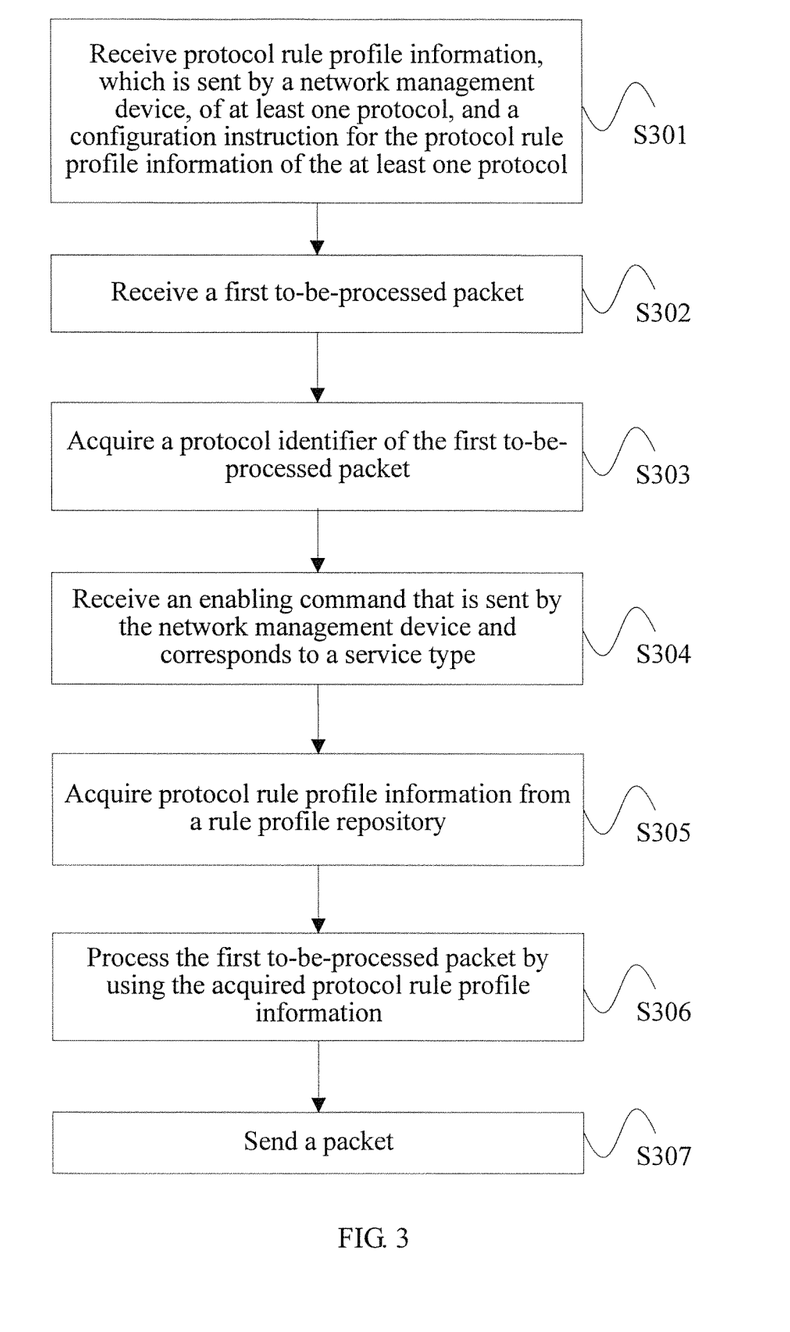
FIG. 3 is a flowchart of Embodiment 3 of a packet processing method according to the present disclosure.

FIG. 3 is a flowchart of Embodiment 3 of a packet processing method according to the present disclosure. As shown in FIG. 3, a service type in this embodiment is network communication, and the method includes:

S301: Receive protocol rule profile information, which is sent by a network management device, of at least one protocol, and a configuration instruction for the protocol rule profile information of the at least one protocol.

When a packet processing apparatus is used for the first time, the network management device sends, according to protocols that need to be supported by the packet processing apparatus, protocol rule profile information that corresponds to the protocols. In this embodiment, the protocols that need to be supported are, for example, a VXLAN protocol and an NVGRE protocol, and the network management device parses content of the VXLAN protocol and the NVGRE protocol to obtain protocol rule profile information shown in Table 1, and stores the protocol rule profile information in a rule profile repository of the packet processing apparatus, where the protocol rule profile information may be identified by a built-in operation, which is in the packet processing apparatus, for performing the network communications service or other services.

TABLE 1

| Profile VXLAN (01) | Profile NVGRE (02) |
|---|---|
| Service 1 (0305) | Service 1 (0305) |
| [FORMAT] eth/ip/udp/payload<br>Packet:<br>eth[1]-ip[1]-udp[1]-proto[1]-<br>eth[2]-ip[2]-payload;<br>proto[1]: 08-00-00-00-VNI-00;<br>[FIELD]<br>Name: outer_dst_mac;<br>Position: eth[1];<br>Offset: 0; Length: 6;<br>Name: outer_src_mac;<br>Position: eth[1];<br>Offset: 6; Length: 6;<br>Name: outer_src_ip;<br>Position:ip[1];<br>Offset: 12; Length: 4;<br>Name: outer_dst_ip;<br>Position: ip[1];<br>Offset: 16; Length: 4;<br>Name: ip_protocol;<br>Position: ip[1];<br>Offset: 9; Length: 1;<br>Name: dst_port;<br>Position: udp[1];<br>Offset: 2; Length: 2;<br>Name: VNI;<br>Position: proto[1];<br>Offset: 4; Length: 3; | [FORMAT] eth/ip /payload<br>Packet:<br>eth[1]-ip[1]- proto[1]-<br>eth[2]-ip[2]-payload;<br>proto[1]:<br>0x20-00-0x65-0x58-VSID-00;<br>[FIELD]<br>Name: outer_dst_mac;<br>Position: eth[1];<br>Offset: 0; Length: 6;<br>Name: outer_src_mac;<br>Position: eth[1];<br>Offset: 6; Length: 6;<br>Name: outer_src_ip;<br>Position:ip[1];<br>Offset: 12; Length: 4;<br>Name: outer_dst_ip;<br>Position: ip[1];<br>Offset: 16; Length: 4;<br>Name: ip_protocol;<br>Position: ip[1];<br>Offset: 9; Length: 1;<br>Name: gre_protocol;<br>Position: proto[1];<br>Offset: 2; Length: 2;<br>Name: VSID;<br>Position: proto[1]; |

TABLE 1-continued

| Profile VXLAN (01) | Profile NVGRE (02) |
|---|---|
| Name: inner_dst_mac;<br>Position: eth[2];<br>Offset: 0; Length: 6;<br>Name: inner_src_mac;<br>Position: eth[2];<br>Offset: 6; Length: 6;<br>Name: inner_src_ip;<br>Position:ip[2];<br>Offset: 12; Length: 4;<br>Name: inner_dst_ip;<br>Position:ip[2];<br>Offset: 16; Length: 4;<br>[IDENTIFICATION]<br>ip_protocol: 0x11; dst_port:<br>0x2118;<br>[OPERATION]<br>FORWARD: dst_ip: inner_dst_ip;<br>dst_mac: inner_dst_mac; domain:<br>VNI;<br>LB: para[1]: outer_src_ip;<br>para[2]: outer_dst_ip;<br>para[3]: Name: inner_src_ip;<br>para[4]: inner_dst_ip; para[5]:<br>VNI; | Offset: 4; Length: 3;<br>Name: inner_dst_mac;<br>Position: eth[2];<br>Offset: 0; Length: 6;<br>Name: inner_src_mac;<br>Position: eth[2];<br>Offset: 6; Length: 6;<br>Name: inner_src_ip;<br>Position:ip[2];<br>Offset: 12; Length: 4;<br>Name: inner_dst_ip;<br>Position:ip[2];<br>Offset: 16; Length: 4;<br>[IDENTIFICATION]<br>ip_protocol: 0x2F; gre_protocol:<br>0x6558;<br>[OPERATION]<br>FORWARD: dst_ip:<br>inner_dst_ip; dst_mac:<br>inner_dst_mac; domain:<br>VSID;<br>LB: para[1]: outer_src_ip;<br>para[2]: outer_dst_ip;<br>para[3]: Name: inner_src_ip;<br>para[4]: inner_dst_ip; para[5]:<br>VSID; |
| Service 2 (0306) | Service 2 (0306) |
| . . . | . . . |
|  . . . |

In the two types of protocol rule profile information provided in Table 1, [FORMAT] defines a keyword "eth/ip/udp/payload" and a packet format that can be identified by a built-in operation, where eth represents an Ethernet header field, ip represents an IP header field, udp represents a UDP (User Datagram Protocol) header field, and payload represents data payload; and proto is used as a keyword for defining a format that cannot be identified by a built-in operation, that is, newly added content (a character, an assigned value, a format, or the like) that has not been identified by a built-in operation before appears in a new protocol, and when the new protocol is parsed to obtain protocol rule profile information, the keyword "proto" is used to define the newly added content that appears in the new protocol. For example, a data format that has not been identified by a built-in operation before is newly added to the VXLAN protocol, where the data format includes 4 constants "08-00-00-00", a variable "VNI", and a constant "00", and when the VXLAN protocol is parsed to obtain protocol rule profile information, the keyword proto is used to define the data format "08-00-00-00-VNI-00".

"Packet: eth[1]-ip[1]-udp[1]-proto[1]-eth[2]-ip[2]-payload" defines a format and a variable parameter that are used for packet decapsulation/encapsulation, where eth[1] represents the first Ethernet header field, eth[2] represents the second Ethernet header field, and similarly, a value in square brackets after a keyword such as ip or udp stipulates a specific field.

[FIELD] defines a variable parameter, where outer_dst_mac, outer_src_mac, outer_src_ip, outer_dst_ip, ip_protocol, dst_port, VNI/VSID, inner_dst_mac, inner_src_mac, inner_src_ip, and inner_dst_ip are all variable parameters, and assigned values of the variable parameters may be obtained according to a specific read method stipulated in Position. For example, an assigned value of the variable outer_scr_mac is obtained through reading according to "Position: eth[1]; Offset: 6; Length: 6", that is, an offset of 6 bytes is made from the start position of the eth[1] field, bytes from the seventh byte to the twelfth byte are read, and a read result is used as the assigned value of the variable outer_scr_mac.

[IDENTIFICATION] defines a protocol identification rule, [OPERATION] defines a parameter needed by the network communications service, FORWARD represents a sub-service used to control packet receiving and sending, and LB represents a sub-service used to control load balancing. dst_ip, dst_mac, and domain in "dst_ip: inner_dst_ip; dst_mac: inner_dst_mac; domain: VNI" are parameters needed by a built-in operation in the network communications service, and specific assigned values of these parameters are determined by the assigned values of the variable parameters such as inner_dst_ip, or the assigned values of the parameters such as dst_ip, dst_mac, and domain may also be directly stipulated in the protocol rule profile information.

In addition, Table 1 is only used as an example to describe the protocol rule profile information, and a specific manner in which the rule profile repository stores the protocol rule profile information, and a character, a format, and the like that are used are not limited to those in Table 1.

It should be noted that S301 is an optional step. That is, when the packet processing apparatus is used for the first time and not configured with the protocol rule profile information, S301 is performed. For a packet processing apparatus that is already configured with protocol rule profile information and can process a packet, during processing on a first to-be-processed packet, S301 does not need to be performed, and S302 may be directly performed.

S302: Receive a first to-be-processed packet.

When performing S302, the packet processing apparatus does not know a service type relating to the received first to-be-processed packet, and a standard of a protocol that the received first to-be-processed packet meets.

S303: Acquire a protocol identifier of the first to-be-processed packet.

Variable parameters that are defined in [IDENTIFICATION] in the protocol rule profile information and needed to identify a protocol are "ip_protocol, dst_port"; corresponding locations are read according to corresponding read methods defined in "Position: udp[1]; Offset: 2; Length: 2" and "Position: ip[1]; Offset: 9; Length: 1", an assigned value 0x11 is obtained for the variable parameter ip_protocol, and an assigned value 0x2118 is obtained for the variable parameter dst_port; and 0x11 and 0x2118 successfully match the VXLAN protocol in the rule profile repository, thereby obtaining a protocol identifier 01.

In this embodiment, read locations in the protocol rule profile information of the VXLAN protocol and the NVGRE protocol are the same. However, in an actual application, when the read locations in the two types of protocol rule profile information may be different, the read locations in the two types of protocol rule profile information are separately read, and matching is subsequently performed between read content and a corresponding protocol identifier.

S304: Receive an enabling command that is sent by the network management device and corresponds to a service type.

A specific acquiring method is described in S204, and is not described in detail herein again. However, it should be noted that when it is preset during initialization that the packet processing apparatus is responsible only for one service type, as an option, S304 may not be performed and S305 may be directly performed according to an actual condition. In this embodiment, the packet processing apparatus is responsible for processing multiple types of services, that is, S304 is performed, and S304 may be performed before S303, or may be performed after S303.

S305: Acquire protocol rule profile information from a rule profile repository.

In this embodiment, the packet processing apparatus may be responsible for various service types; therefore, the acquiring protocol rule profile information is determining, according to first protocol rule profile information that corresponds to the protocol identifier 01, protocol rule profile sub-information that corresponds to the service type 0305, that is, protocol rule profile sub-information of service 1 under the VXLAN protocol.

S306: Process the first to-be-processed packet by using the acquired protocol rule profile information.

As described in S103, built-in operations in the network communications service include learning a packet address, searching for a forwarding table, and re-encapsulating a packet.

Specific content is as follows:

a. Learn an address. Because the protocol identifier of the first to-be-processed packet is 01, a destination MAC address (the assigned value of the variable parameter inner_dst_mac), a destination IP address (the assigned value of the variable parameter inner_dst_ip), a network domain identifier (the assigned value of the variable parameter VNI), and the like are acquired according to the corresponding first protocol rule profile information. It may be understood that when the protocol identifier of the first to-be-processed packet is 02, a destination MAC address (the assigned value of the variable parameter inner_dst_mac), a destination IP address (the assigned value of the variable parameter inner_dst_ip), a network identifier (an assigned value of a variable parameter VSID), and the like are acquired according to the corresponding protocol rule profile information. Therefore, it can be learned that the built-in operations are irrelevant to a protocol, and during processing on a packet in each operation, only protocol rule profile information corresponding to a protocol identifier that corresponds to the packet needs to be acquired from the rule profile repository, and the packet can be processed according to a corresponding method and parameter.

b. Search for a forwarding table. It is learned that VNI=6000 by learning an address under the VXLAN protocol, and because the configuration instruction stipulates that VNI=6000 and VSID=3000 indicate a same forwarding domain, a destination is determined in a forwarding table of a network that corresponds to VSID=3000 according to a destination IP address and a destination MAC address.

c. Re-encapsulation. It is learned according to VSID=3000 that the destination is a network that uses the NVGRE protocol; therefore, VXLAN packet encapsulation of the packet is removed according to the protocol rule profile information under the VXLAN protocol, and NVGRE packet encapsulation is added according to the protocol rule profile information under the NVGRE protocol. The VXLAN packet encapsulation of the packet is removed according to a method, a parameter, and the packet format that are described in [FORMAT] in the protocol rule profile information under the VXLAN protocol, to acquire payload, and NVGRE packet encapsulation is performed according to a method, a parameter, and the packet format that are described in [FORMAT] in the protocol rule profile information under the NVGRE protocol.

More preferably, in this embodiment, the packet processing apparatus further has a function of controlling load balancing. During sending of the first to-be-processed packet, the first to-be-processed packet may be sent out through any physical interface that belongs to a same logical interface, and to avoid additional overhead caused by packet disorder, packets that belong to a same flow should be sent out through a same physical interface. Therefore, in a process of performing step a to step c, the following built-in operations that correspond to an LB sub-service may also be performed:

d. Acquire a flow identifier. Corresponding to the protocol identifier 01, according to "LB: para[1]: outer_src_ip; para[2]: outer_dst_ip; para[3]: Name: inner_src_ip; para[4]: inner_dst_ip; para[5]: VNI" in the protocol rule profile table, the assigned values of the 5 variable parameters "outer_src_ip, outer_dst_ip, VNI, inner_src_ip, inner_dst_ip" are used as flow identifiers for a hash operation. It may be understood that when the packet corresponds to another protocol identifier, when the operation of acquiring a flow identifier is performed, assigned values of corresponding variable parameters are acquired as stipulated in corresponding protocol rule profile information. For example, a flow identifier acquiring method stipulated in a protocol rule profile information that corresponds to a protocol identifier is different from the method that corresponds to the protocol identifier 01, and a parameter is also different, that is, it may be that only three types of flow identifiers are needed.

e. Determine a sending interface.

An operation for determining a sending interface such as the hash operation is performed, according to the corresponding protocol rule profile information, on the five types of flow identifiers that are obtained corresponding to the protocol identifier 01, and a physical interface for sending a packet is determined according to a value obtained by the operation.

S307: Send a packet.

The packet is sent to the destination on the network that uses the NVGRE protocol.

In this embodiment, Embodiment 1 and Embodiment 2 are applied in a network communications service, and in an actual environment, Embodiment 1 and Embodiment 2 are further applicable to another packet processing service such as a subscription information acquiring service or a network environment monitoring service. A program developer needs to develop only built-in operations that match each service and are irrelevant to a protocol, and when a packet for each protocol is processed, the packet is processed in the built-in operations according to protocol rule profile information.

In this embodiment, each protocol is parsed to obtain protocol rule profile information, and the protocol rule profile information is stored in a rule profile repository; and during processing on a packet, the packet is processed in an operation according to the protocol rule profile information. That is, the processing on the packet may not be limited by a protocol, a process of processing the packet is simplified, and processing programs do not need to be developed according to a protocol, thereby saving development resources, and helping improve network service performance.

Figure 4:
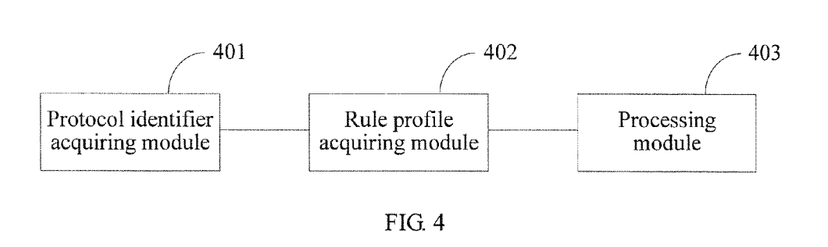
FIG. 4 is a structural diagram of Embodiment 1 of a packet processing apparatus according to the present disclosure.

FIG. 4 is a structural diagram of Embodiment 1 of a packet processing apparatus according to the present disclosure. As shown in FIG. 4, the apparatus includes:

a protocol identifier acquiring module 401, configured to acquire a first protocol identifier of a first to-be-processed packet;

a rule profile acquiring module 402, configured to acquire, from a rule profile repository, first protocol rule profile information that corresponds to the first protocol identifier, where the rule profile repository stores protocol rule profile information of at least one protocol, the protocol rule profile information of the at least one protocol is associated with a protocol identifier of the at least one protocol, the protocol rule profile information of the at least one protocol is used to describe a method and a parameter for processing a packet, and the packet meets a standard stipulated by the at least one protocol; and a processing module 403, configured to process the first to-be-processed packet according to the first protocol rule profile information.

In this embodiment, the packet processing apparatus uses protocol rule profile information that is stored in a rule profile repository and corresponds to each protocol, and during processing on different packets under each protocol, in a built-in operation that is not limited by a protocol, the packets are processed according to protocol rule profile information. That is, the processing on the packets may not be limited by each protocol, processes of processing the packets under each protocol are simplified, and processing programs do not need to be developed according to each protocol, thereby saving development resources, and helping improve network service performance.

Figure 5:
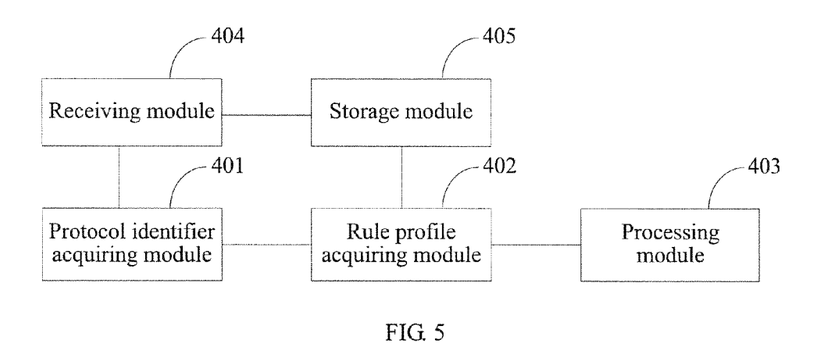
FIG. 5 is a structural diagram of Embodiment 2 of a packet processing apparatus according to the present disclosure.

FIG. 5 is a structural diagram of Embodiment 2 of a packet processing apparatus according to the present disclosure. As shown in FIG. 5, the protocol identifier acquiring module 401 is configured to read the first to-be-processed packet according to a read location that is of the first protocol identifier and that is described in the protocol rule profile information, which is in the rule profile repository, of the at least one protocol; and when a read result matches a parameter that is described in the protocol rule profile information and corresponds to the read location, determine the first protocol identifier of the first to-be-processed packet; or the protocol identifier acquiring module 401 is configured to read the first to-be-processed packet from a preset location of the first to-be-processed packet, and when a read result matches a parameter that is described in the protocol rule profile information and corresponds to the preset location, determine the first protocol identifier of the first to-be-processed packet.

Further, the apparatus further includes a receiving module 404, configured to receive an enabling command that is sent by a network management device and corresponds to a service type; and the rule profile acquiring module 402 is configured to acquire, from the rule profile repository, first protocol rule profile sub-information, which corresponds to the service type, of the first protocol rule profile information that corresponds to the first protocol identifier, where protocol rule profile information of each protocol in the protocol rule profile information, which is stored in the rule profile repository, of the at least one protocol is classified, according to at least one service type, into at least one piece of protocol rule profile sub-information, the protocol rule profile sub-information is associated with the service type, and the protocol rule profile sub-information is used to describe a method and a parameter for processing, based on the service type, the packet.

Further, the receiving module 404 is further configured to receive the protocol rule profile information that is sent by the network management device and corresponds to the at least one protocol, where the protocol rule profile information of the at least one protocol is obtained by the network management device by parsing content of the at least one protocol, and a method and a parameter for processing a packet that meets a standard stipulated by each protocol of the at least one protocol are stipulated in content of the protocol; and the apparatus further includes a storage module 405, configured to associate the protocol rule profile information of the at least one protocol with the protocol identifier of the at least one protocol, and store the protocol rule profile information of the at least one protocol in the rule profile repository.

The receiving module 404 is further configured to receive a configuration instruction, which is sent by the network management device, for the protocol rule profile information of the at least one protocol.

The method for processing includes at least one of the following methods:

identifying a protocol, learning an address, re-encapsulating, acquiring a flow identifier, and determining a sending interface; and the parameter includes at least one of the following parameters:

a protocol identifier, a packet format, a source Internet Protocol IP address, a destination IP address, a destination Media Access Control MAC address, a source MAC address, a network identifier, and a computing value for determining the sending interface.

The foregoing modules correspond to the foregoing method embodiments, and details are not described herein again.

In this embodiment, a packet processing apparatus uses protocol rule profile information that is stored in a rule profile repository and corresponds to each protocol, and during processing on a packet, the packet is processed according to the protocol rule profile information. That is, the processing on the packet may not be limited by a protocol, a process of processing the packet is simplified, and processing programs do not need to be developed according to a protocol, thereby saving development resources, and helping improve network service performance.

Figure 6:
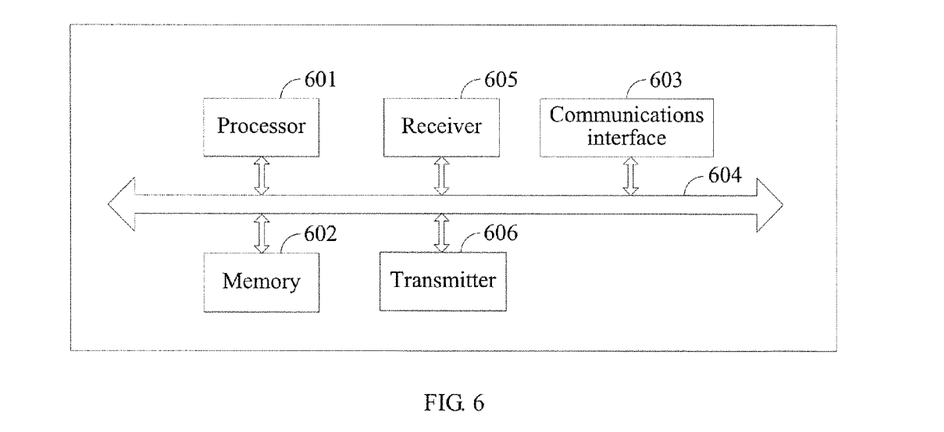
FIG. 6 is a schematic diagram of a hardware structure of a packet processing apparatus according to an embodiment of the present disclosure.

FIG. 6 is a schematic diagram of a hardware structure of a packet processing apparatus according to an embodiment of the present disclosure. As shown in FIG. 6, the apparatus includes: a processor 601, a memory 602, a communications interface 603, a bus 604, a receiver 605, and a transmitter 606.

The processor 601, the memory 602, and the communications interface 603 are connected to each other by using the bus 604, and the bus 604 may be an ISA bus, a PCI bus, an EISA bus, or the like. The bus may be classified into an address bus, a data bus, a control bus, and the like. For ease of representation, in FIG. 6, only one thick line is used to represent the buses, which does not indicate that there is only one bus or only one type of bus.

The memory 602 is configured to store a program. The program may include program code, and the program code includes a computer operation instruction. The memory 602 may include a high-speed RAM memory, and may further include a non-volatile memory, for example, at least one magnetic disk memory.

The processor 601 executes the program stored in the memory 602, and is configured to acquire a first protocol identifier of a first to-be-processed packet; and is further configured to acquire, from a rule profile repository, first protocol rule profile information that corresponds to the first protocol identifier, where the rule profile repository stores protocol rule profile information of at least one protocol, the protocol rule profile information of the at least one protocol is associated with a protocol identifier of the at least one protocol, the protocol rule profile information of the at least one protocol is used to describe a method and a parameter for processing a packet, and the packet meets a standard stipulated by the at least one protocol. The processor 601 processes the first to-be-processed packet according to the first protocol rule profile information.

Further, the processor 601 is configured to read the first to-be-processed packet according to a read location that is of the first protocol identifier and that is described in the protocol rule profile information, which is in the rule profile repository, of the at least one protocol; and when a read result matches a parameter that is described in the protocol rule profile information and corresponds to the read location, determine the first protocol identifier of the first to-be-processed packet; or the processor 601 is configured to read the first to-be-processed packet from a preset location of the first to-be-processed packet, and when a read result matches a parameter that is described in the protocol rule profile information and corresponds to the preset location, determine the first protocol identifier of the first to-be-processed packet.

The receiver 605 is further configured to receive an enabling command that is sent by a network management device and corresponds to a service type; and the processor 601 is configured to acquire, from the rule profile repository, first protocol rule profile sub-information, which corresponds to the service type, of the first protocol rule profile information that corresponds to the first protocol identifier, where protocol rule profile information of each protocol in the protocol rule profile information, which is stored in the rule profile repository, of the at least one protocol is classified, according to at least one service type, into at least one piece of protocol rule profile sub-information, the protocol rule profile sub-information is associated with the service type, and the protocol rule profile sub-information is used to describe a method and a parameter for processing, based on the service type, the packet.

Further, the receiver 605 is further configured to receive the protocol rule profile information that is sent by the network management device and corresponds to the at least one protocol, where the protocol rule profile information of the at least one protocol is obtained by the network management device by parsing content of the at least one protocol, and a method and a parameter for processing a packet that meets a standard stipulated by each protocol of the at least one protocol are stipulated in content of the protocol; and the memory 602 is configured to associate the protocol rule profile information of the at least one protocol with the protocol identifier of the at least one protocol, and store the protocol rule profile information of the at least one protocol in the rule profile repository.

More specifically, the receiver 605 is further configured to receive a configuration instruction, which is sent by the network management device, for the protocol rule profile information of the at least one protocol.

It should be noted that the method for processing includes at least one of the following methods: identifying a protocol, learning an address, re-encapsulating, acquiring a flow identifier, and determining a sending interface; and the parameter includes at least one of the following parameters:

a protocol identifier, a packet format, a source Internet Protocol IP address, a destination IP address, a destination Media Access Control MAC address, a source MAC address, a network identifier, and a computing value for determining the sending interface.

When the processor 601 completes processing on the first to-be-processed packet, the transmitter 606 sends, according to a specific service type, a processed packet.

In this embodiment, a processor uses protocol rule profile information that is stored in a rule profile repository and corresponds to each protocol, and during processing on a packet, the packet is processed according to the protocol rule profile information. That is, the processing on the packet may not be limited by a protocol, a process of processing the packet is simplified, and processing programs do not need to be developed according to a protocol, thereby saving development resources, and helping improve network service performance.

Persons of ordinary skill in the art may understand that all or part of the steps of the method embodiments may be implemented by a program instructing relevant hardware. The program may be stored in a computer-readable storage medium. When the program runs, the steps of the method embodiments are performed. The foregoing storage medium includes: any medium that can store program code, such as a ROM, a RAM, a magnetic disk, or an optical disc.

Finally, it should be noted that the foregoing embodiments are merely intended to describe the technical solutions of the present disclosure, but not to limit the present disclosure. Although the present disclosure is described in detail with reference to the foregoing embodiments, persons of ordinary skill in the art should understand that they may still make modifications to the technical solutions described in the foregoing embodiments or make equivalent replacements to part of or all technical features thereof, without departing from the scope of the technical solutions of the embodiments of the present disclosure.

What is claimed is:

1. A packet processing method, comprising:
    acquiring a first protocol identifier of a first to-be-processed packet;
    acquiring, from a rule profile repository, first protocol rule profile information that corresponds to the first protocol identifier, wherein the rule profile repository stores protocol rule profile information of at least one protocol, protocol rule profile information of each protocol in the at least one protocol is associated with a protocol identifier of the protocol, the protocol rule profile information of the protocol is used to describe a method and a parameter for processing a packet, and the packet meets a standard stipulated by the protocol;
    processing the first to-be-processed packet according to the first protocol rule profile information; and
    wherein acquiring the first protocol identifier of a first to-be-processed packet comprises:
        reading the first to-be-processed packet according to a read location of a protocol identifier and that is described in protocol rule profile information, which is in the rule profile repository, of a protocol in the at least one protocol, and when a read result from the read location of the first to-be-processed packet matches a parameter that is described in the protocol rule profile information, determining the first protocol identifier of the first to-be-processed packet, or
        reading the first to-be-processed packet from a preset location of the first to-be-processed packet, and when a read result from the preset location of the first to-be-processed packet matches a parameter that is described in the protocol rule profile information, determining the first protocol identifier of the first to-be-processed packet.

2. The method according to claim 1, wherein:
before acquiring, from a rule profile repository, first protocol rule profile information that corresponds to the first protocol identifier, the method further comprises:
receiving an enabling command that is sent by a network management device and corresponds to a service type; and
acquiring, from a rule profile repository, first protocol rule profile information that corresponds to the first protocol identifier comprises:
acquiring, from the rule profile repository, first protocol rule profile sub-information, which corresponds to the service type, of the first protocol rule profile information that corresponds to the first protocol identifier, wherein protocol rule profile information of each protocol in the at least one protocol is classified, according to at least one service type, into at least one piece of protocol rule profile sub-information, the protocol rule profile sub-information is associated with the service type, and the protocol rule profile sub-information is used to describe a method and a parameter for processing, based on the service type, a packet.

3. The method according to claim 2, wherein before acquiring a first protocol identifier of a first to-be-processed packet, the method further comprises:
receiving the protocol rule profile information that is sent by the network management device and corresponds to the at least one protocol, wherein protocol rule profile information of each protocol in the at least one protocol is obtained by the network management device by parsing content of the protocol, and a method and a parameter for processing a packet that meets a standard stipulated by the protocol are stipulated in content of the protocol; and
associating the protocol rule profile information of the protocol with a protocol identifier of the protocol, and storing the protocol rule profile information of the protocol in the rule profile repository.

4. The method according to claim 3, wherein before acquiring, from a rule profile repository, first protocol rule profile information that corresponds to the first protocol identifier, the method further comprises:
receiving a configuration instruction, which is sent by the network management device, for the protocol rule profile information of each protocol in the at least one protocol.

5. The method according to claim 1, wherein:
before acquiring, from a rule profile repository, first protocol rule profile information that corresponds to the first protocol identifier, the method further comprises:
receiving an enabling command that is sent by a network management device and corresponds to a service type; and
acquiring, from a rule profile repository, first protocol rule profile information that corresponds to the first protocol identifier comprises:
acquiring, from the rule profile repository, first protocol rule profile sub-information, which corresponds to the service type, of the first protocol rule profile information that corresponds to the first protocol identifier, wherein protocol rule profile information of each protocol in the at least one protocol is classified, according to at least one service type, into at least one piece of protocol rule profile sub-information, the protocol rule profile sub-information is associated with the service type, and the protocol rule profile sub-information is used to describe a method and a parameter for processing, based on the service type, a packet.

6. The method according to claim 5, wherein before acquiring a first protocol identifier of a first to-be-processed packet, the method further comprises:
receiving the protocol rule profile information that is sent by the network management device and corresponds to the at least one protocol, wherein protocol rule profile information of each protocol in the at least one protocol is obtained by the network management device by parsing content of the protocol, and a method and a parameter for processing a packet that meets a standard stipulated by the protocol are stipulated in content of the protocol; and
associating the protocol rule profile information of the protocol with a protocol identifier of the protocol, and storing the protocol rule profile information of the protocol in the rule profile repository.

7. A packet processing apparatus, comprising: a processor; and
memory coupled to the processor, the memory comprising instructions that, when executed by the processor, cause the apparatus to: acquire a first protocol identifier of a first to-be-processed packet,
acquire, from a rule profile repository, first protocol rule profile information that corresponds to the first protocol identifier, wherein the rule profile repository stores protocol rule profile information of at least one protocol, protocol rule profile information of each protocol in the at least one protocol is associated with a protocol identifier of the protocol, the protocol rule profile information of the protocol is used to describe a method and a parameter for processing a packet, and the packet meets a standard stipulated by the protocol,
process the first to-be-processed packet according to the first protocol rule profile information, and
read the first to-be-processed packet according to a read location of a protocol identifier and that is described in protocol rule profile information, which is in the rule profile repository, of a protocol in the at least one protocol, and when a read result from the read location of the first to-be-processed packet matches a parameter that is described in the protocol rule profile information, determine the first protocol identifier of the first to-be-processed packet, or
read the first to-be-processed packet from a preset location of the first to-be-processed packet, and when a read result from the preset location of the first to-be-processed packet matches a parameter that is described in the protocol rule profile information, determine the first protocol identifier of the first to-be-processed packet.

8. The apparatus according to claim 7, wherein the memory further comprises instructions that, when executed by the processor, cause the apparatus to:
before acquiring, from a rule profile repository, first protocol rule profile information that corresponds to the first protocol identifier:
receive an enabling command that is sent by a network management device and corresponds to a service type; and
acquire, from the rule profile repository, first protocol rule profile sub-information, which corresponds to the service type, of the first protocol rule profile information that corresponds to the first protocol identifier, wherein protocol rule profile information of each protocol in the at least one protocol is classified, according to at least one service type, into at least one piece of protocol rule profile sub-information, the protocol rule profile sub-information is associated with the service type, and the protocol rule profile sub-information is used to describe a method and a parameter for processing, based on the service type, a packet.

9. The apparatus according to claim 8, wherein the memory further comprises instructions that, when executed by the processor, cause the apparatus to:

before acquiring a first protocol identifier of a first to-be-processed packet:

receive the protocol rule profile information that is sent by the network management device and corresponds to the at least one protocol, wherein protocol rule profile information of each protocol in the at least one protocol is obtained by the network management device by parsing content of the protocol, and a method and a parameter for processing a packet that meets a standard stipulated by the protocol are stipulated in content of the protocol; and associate the protocol rule profile information of the protocol with a protocol identifier of the protocol, and store the protocol rule profile information of the protocol in the rule profile repository.

10. The apparatus according to claim 9, wherein the memory further comprises instructions that, when executed by the processor, cause the apparatus to:

before acquiring, from a rule profile repository, first protocol rule profile information that corresponds to the first protocol identifier:

receive a configuration instruction, which is sent by the network management device, for the protocol rule profile information of each protocol in the at least one protocol.

11. The apparatus according to claim 7, wherein the memory further comprises instructions that, when executed by the processor, cause the apparatus to:

before acquiring, from a rule profile repository, first protocol rule profile information that corresponds to the first protocol identifier:

receive an enabling command that is sent by a network management device and corresponds to a service type; and acquire, from the rule profile repository, first protocol rule profile sub-information, which corresponds to the service type, of the first protocol rule profile information that corresponds to the first protocol identifier, wherein protocol rule profile information of each protocol in the at least one protocol is classified, according to at least one service type, into at least one piece of protocol rule profile sub-information, the protocol rule profile sub-information is associated with the service type, and the protocol rule profile sub-information is used to describe a method and a parameter for processing, based on the service type, a packet.

12. The apparatus according to claim 11, wherein the memory further comprises instructions that, when executed by the processor, cause the apparatus to:

before acquiring a first protocol identifier of a first to-be-processed packet:

receive the protocol rule profile information that is sent by the network management device and corresponds to the at least one protocol, wherein protocol rule profile information of each protocol in the at least one protocol is obtained by the network management device by parsing content of the protocol, and a method and a parameter for processing a packet that meets a standard stipulated by the protocol are stipulated in content of the protocol; and associate the protocol rule profile information of the protocol with a protocol identifier of the protocol, and store the protocol rule profile information of the protocol in the rule profile repository.

* * * * *